United States Patent
Kuiper et al.

(10) Patent No.: US 7,301,708 B2
(45) Date of Patent: Nov. 27, 2007

(54) VARIABLE LENS

(75) Inventors: Stein Kuiper, Eindhoven (NL);
Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 86 days.

(21) Appl. No.: 10/556,243

(22) PCT Filed: May 10, 2004

(86) PCT No.: PCT/IB2004/050618

§ 371 (c)(1),
(2), (4) Date: Nov. 10, 2005

(87) PCT Pub. No.: WO2004/102250

PCT Pub. Date: Nov. 25, 2004

(65) Prior Publication Data
US 2007/0139785 A1 Jun. 21, 2007

(30) Foreign Application Priority Data
May 14, 2003 (EP) .................. 03101335

(51) Int. Cl.
*G02B 1/06* (2006.01)
*G02B 3/12* (2006.01)

(52) U.S. Cl. .................. 359/665; 359/666; 359/667

(58) Field of Classification Search ......... 359/665–667
See application file for complete search history.

(56) References Cited

U.S. PATENT DOCUMENTS

| 4,890,903 A | * | 1/1990 | Treisman et al. ............ 359/666 |
| 6,369,954 B1 | | 4/2002 | Berge et al. |
| 2006/0274425 A1 | * | 12/2006 | Kuiper et al. ............... 359/665 |

FOREIGN PATENT DOCUMENTS

| DE | 19710668 | 9/1998 |
| WO | WO99/18456 | 4/1999 |
| WO | WO02/069016 | 9/2002 |
| WO | WO03/034748 | 4/2003 |

OTHER PUBLICATIONS

Berge B et al: Variable focal lens controlled by an external voltage: an application of electrowetting: European Physical Journal E. Soft Matter, EDP . . . hand col., paragraph 1—p. 160, right-hand col., paragraph 2; figure 1. No copy provided.

* cited by examiner

*Primary Examiner*—Evelyn A. Lester
(74) *Attorney, Agent, or Firm*—Michael E. Belk (57) ABSTRACT

A variable lens includes a chamber defined by at least one side wall and has an optical axis extending longitudinally through the chamber. The chamber contains a first fluid and a second fluid contact over a meniscus extending transverse the optical axis. The perimeter of the meniscus is constrained by the side walls. The fluids are substantially immiscible, and have different indices of refraction. At least one pump is arranged to controllably alter the position of the meniscus along the optical axis by altering the relative volume of each of the fluids contained within the chamber.

12 Claims, 9 Drawing Sheets

VARIABLE LENS

FIELD OF THE INVENTION

The present invention relates to a variable lens, to optical devices including such a lens, and to methods of manufacturing such lenses and such devices.

BACKGROUND OF THE INVENTION

A lens is a device that can focus (converge or diverge) one or more wavelengths of light. The term light is understood to include both visible electromagnetic radiation, and other wavelengths of electromagnetic radiation.

A variable (or adjustable) lens is a lens in which one or more properties of the lens can be controllably adjusted e.g. in which either the focal length or the position of the lens can be altered.

Figure 1A:
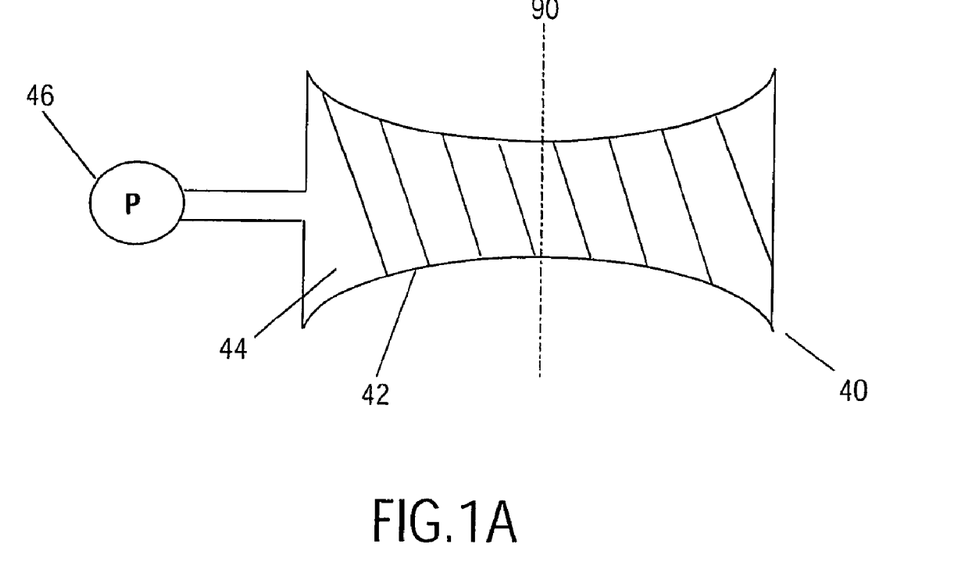
FIGS. 1A and 1B show a known variable lens in schematic cross-section in two different configurations.
Figure 1B:
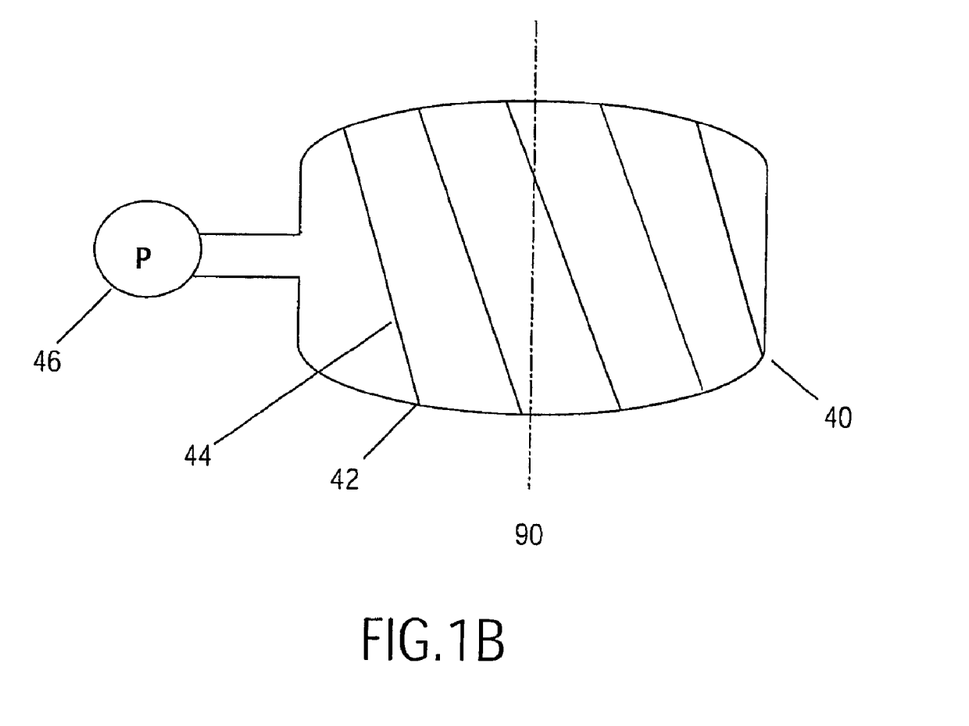

DE 19710668 describes a variable lens system 40, as illustrated in FIGS. 1A and 1B. The lens system 40 comprises a resilient membrane 42 filled with a fluid 44. The pressure of the fluid 44 within the membrane is controlled by means of a pump 46. The dotted line illustrates the optical axis 90 of the lens system 40. The membrane 42 acts as a variable lens, with the shape (and hence power) of the lens varying in dependence upon the pressure of the fluid 44. FIG. 1A shows the fluid 44 at a low pressure i.e. with the membrane 42 forming a bi-concave lens. FIG. 1B shows the fluid 44 at a higher pressure, with the membrane 42 forming a bi-convex lens.

Such a system posses a number of disadvantages. Due to the movement of the membrane surface, it is difficult to maintain good optical properties. Further, it is susceptible to mechanical fatigue. Control of the shape of the lens is not only dependent upon the pressure of the fluid 44, but also the resilience of the membrane 42. Consequently, obtaining a range of desired lens shapes can be problematic, particularly if the elasticity of the membrane 42 changes over time. Further, flexible membranes are not normally gas tight, resulting in the evaporation of the fluid from the device over time.

Variable focus lenses based on electrowetting devices are also known. Electrowetting devices are devices that utilize the electrowetting phenomenon to operate. In electrowetting, the three-phase contact angle is changed with applied voltage. The three-phases constitute two fluids and a solid.

Figure 2:
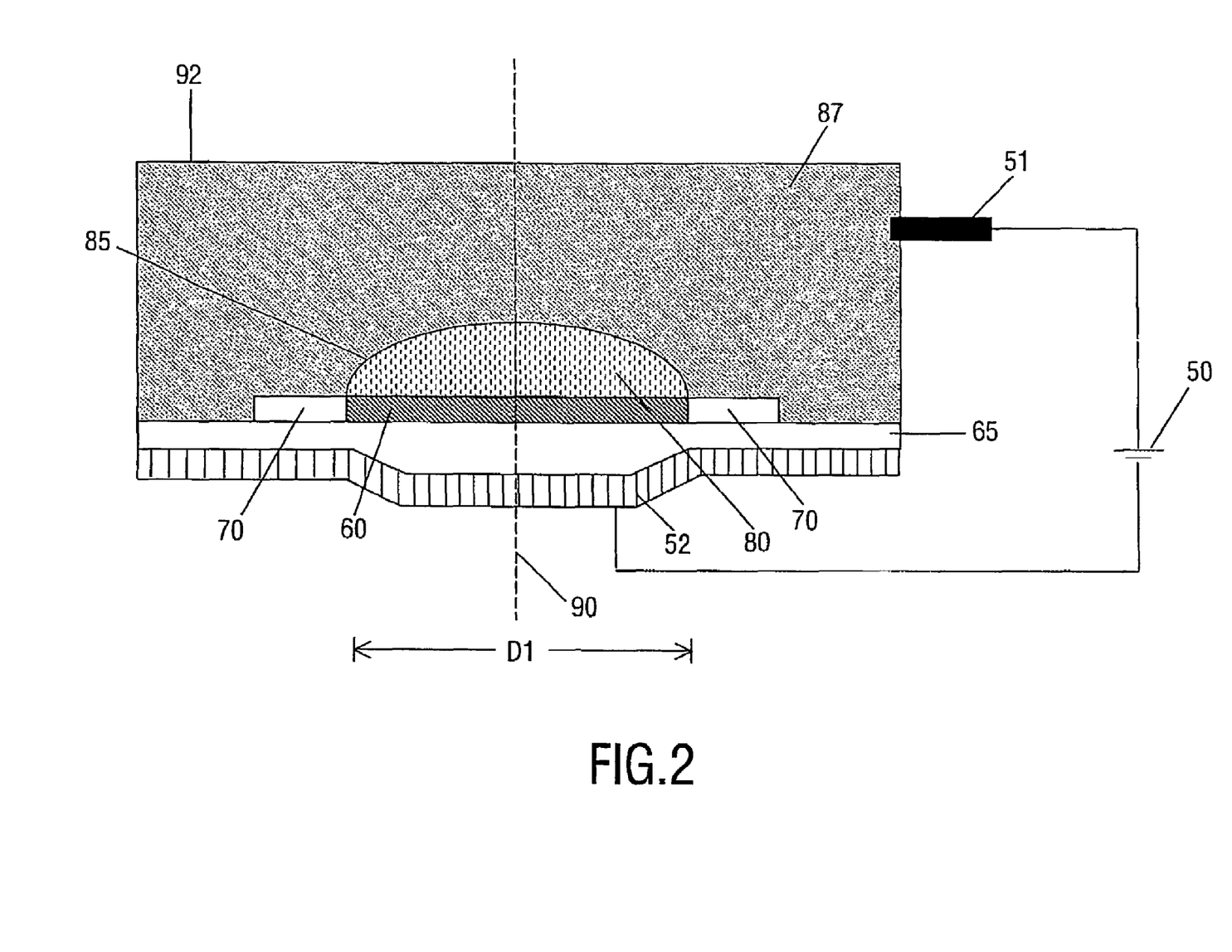
FIG. 2 illustrates a schematic cross-section of a known type of electrowetting variable lens.

International patent application WO 99/18456 describes a variable focus lens utilizing the electrowetting effect. FIG. 2 is a cross-sectional view of such a typical optical device. The device has two immiscible fluids 80, 87 confined in a sealed space 92 (i.e. a chamber or cavity). The term immiscible indicates that the two fluids do not mix. The first fluid 80 is an insulator (e.g. silicone oil) and the second fluid 87 electro conductive (e.g. a mixture of water and ethyl alcohol). The first fluid 80 and the second fluid 87 have different refractive indices.

A voltage from a voltage supply 50 can be applied to the two electrodes 51, 52 so as to produce an electric field between the first fluid 87 and the electrode 52 (an insulating layer 65 prevents the second electrode 52 contacting the conductive second fluid).

By varying the voltage applied to the second fluid 87, the shape of an interface 85 between the first fluid 80 and the second fluid 87 is altered, so as to change the lens function provided by the interface 85. The device in FIG. 1 has a water-repellent film 60 of diameter D1 on the insulating layer 65 surrounded by a ring of a hydrophilic agent 70 so as to locate the first fluid 80.

This electrowetting lens also posses a number of disadvantages. For instance, the lens shape is defined by a variable voltage, with the lens shape being affected by any non-uniformities of the insulating layer. The configuration requires a relatively high voltage to alter the shape of the interface 85. Further, the insulating layer may suffer from charging (especially at high voltages). If the insulating layer is charged unequally, this will lead to unequal contact angles, and thus to non-spherical lens.

Finally, as is also the problem with fixed focus lenses, if it is desirable to maintain the same shape lens, but simply alter the position of the lens, then the complete device must be mechanically moved e.g. by expensive actuators. Such movement can be difficult to control accurately, and can be susceptible to vibrations and mechanical wear and tear.

It is an aim of embodiments of the present invention to provide a variable lens that addresses one or more problems of the prior art, whether referred to herein or otherwise. It is also an aim of the present invention to provide optical devices incorporating such lenses, and methods of manufacturing such lens and such devices.

It is an aim of particular embodiments of the present invention to provide a variable lens in which the optical path is relatively unsusceptible to mechanical wear and tear during operation, but which allows the lens position and the lens focus to be simultaneously adjusted.

STATEMENTS OF THE INVENTION

In a first aspect, the present invention provides a variable lens comprising: a chamber defined by at least one side wall and having an optical axis extending longitudinally through the chamber; the chamber containing a first fluid and a second fluid in contact over a meniscus extending transverse the optical axis, the perimeter of the meniscus being constrained by said side wall, the fluids being substantially immiscible and having different indices of refraction; and at least one pump arranged to controllably alter the position of the meniscus along the optical axis by altering the relative volume of each of said fluids contained within the chamber.

The meniscus between the two fluids acts as a lens, and so the effective position of the lens can easily be adjusted by moving the meniscus. As no mechanical components are required within the optical path of the lens, then the optical path does not suffer from mechanical wear and tear. Further, the lens shape is not subject to a changing voltage, thus making the lens independent of non-uniformities in thickness or composition of the insulating layer. Also, there is no risk of charging of the insulating layer at high voltages.

In another aspect, the present invention provides an optical device comprising a variable lens, the lens comprising: a chamber defined by at least one side wall and having an optical axis extending longitudinally through the chamber; the chamber containing a first fluid and a second fluid in contact over a meniscus extending transverse the optical axis, the perimeter of the meniscus being constrained by said side wall, the fluids being substantially immiscible and having different indices of refraction; and at least one pump arranged to controllably alter the position of the meniscus along the optical axis by altering the relative volume of each of said fluids contained within the chamber.

In a further aspect, the present invention provides a method of manufacturing a variable lens, the method comprising: providing a chamber defined by at least one side wall and having an optical axis extending longitudinally through the chamber; providing a first fluid and a second fluid in the chamber such that the fluids are in contact over a meniscus extending transverse the optical axis, the perimeter of the meniscus being constrained by said side walls, the fluids being substantially immiscible and having different indices of refraction; and providing at least one pump arranged to controllably alter the position of the meniscus along the optical axis by altering the relative volume of each of said fluids contained within the chamber.

In another aspect, the present invention provides a method of manufacturing an optical device, the method comprising the steps of: providing a variable lens, the variable lens comprising: a chamber defined by at least one side wall and having an optical axis extending longitudinally through the chamber; the chamber containing a first fluid and a second fluid in contact over a meniscus extending transverse the optical axis, the perimeter of the meniscus being constrained by said side walls, the fluids being substantially immiscible and having different indices of refraction; and at least one pump arranged to controllably alter the position of the meniscus along the optical axis by altering the relative volume of each of said fluids contained within the chamber.

Other aims and advantages of the present invention will be apparent from the preferred features as set out in the accompanying claims.

BRIEF DESCRIPTION OF DRAWINGS

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENTS

Figure 3A:
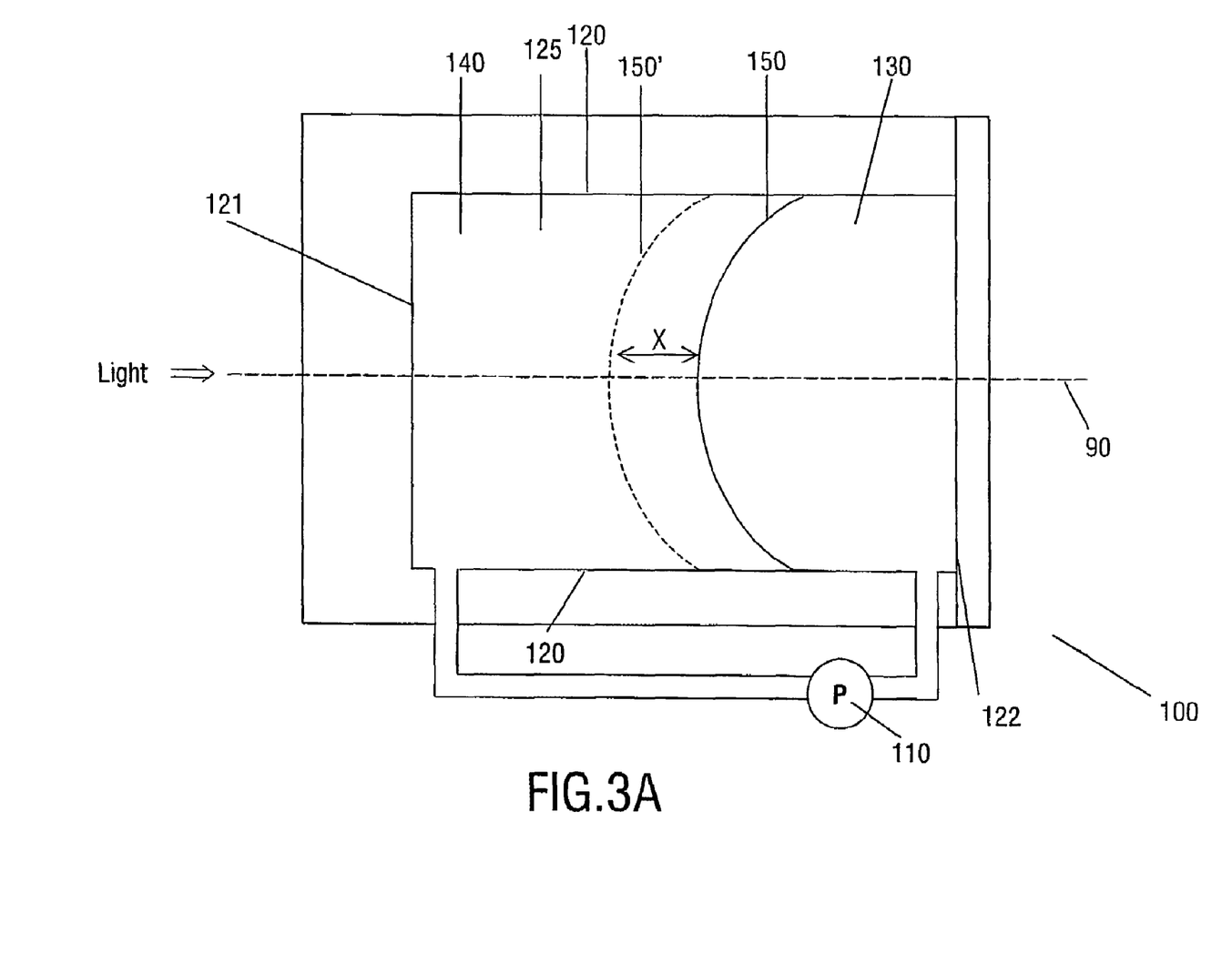
FIGS. 3A and 3B illustrate respectively a schematic cross-section of a variable lens and the equivalent optical function provided by the variable lens in accordance with a first embodiment of the present invention.

FIG. 3A shows a variable lens in accordance with a first embodiment of the present invention. The lens 100 can be regarded as being formed of two distinct elements: a lens function formed by the meniscus 150 between two fluids 130, 140, and a pump 110 arranged to alter the position of the lens function.

A fluid is a substance that alters its shape in response to any force, that tends to flow or to conform to the outline of its chamber, and that includes gases, vapours, liquids and mixtures of solids and liquids capable of flow.

The two fluids 130, 140 are substantially immiscible i.e. the two fluids do not mix. The two fluids 130, 140 have different refractive indices. A lens function is thus provided by the meniscus 150 formed along the contact area of the two fluids, as the fluids have different refractive indices. A lens function is the ability of the meniscus 150 to focus (converge or diverge) one or more wavelengths of the light.

The two fluids are preferably of substantially equal density, so as to minimize the effects of gravity upon the lens 100.

The fluids 130, 140 are enclosed within a chamber 125. In this embodiment, the chamber 125 takes the form of a longitudinally extending tube defined by internal surfaces or side walls 120. An optical axis extends longitudinally through the tube. In this particular example, the chamber is a cylindrical tube, of constant circular cross-sectional area, and the optical axis is co-axial with the tube axis. Additional walls 121, 122 extend across the ends of the tube so as to form a chamber 125 enclosing the fluids. At least the portions of the walls 121, 122 of the chamber 125 lying along the optical axis 90 are transparent.

The meniscus 150 between the two fluids 130, 140 extends transverse the optical axis 90 of the lens 100. The term transverse indicates that the meniscus crosses (i.e. it extends across) the optical axis, and it is not parallel to the optical axis; the meniscus 150 may cross the optical axis 90 at any desired angle. The perimeter of the meniscus 150 is defined by the side walls 120 of the chamber.

Typically, in order to locate the fluids 130, 140 within the desired portion of the chamber 125, different areas of the chamber will have different wettabilities for each fluid, such as each fluid will be attracted by a respective area. Wettability is the extent by which an area is wetted (covered) by a fluid. For instance, if the fluid 130 is a polar fluid, and the fluid 140 a non-polar fluid, then the internal surface of the wall 122 may be hydrophilic so as to attract the polar fluid 130, and not attract the non-polar fluid 140.

The shape of the meniscus 150 is determined by the contact angle of the meniscus edge with the internal surfaces 120. Hence the meniscus shape is dependent upon the wettability of the surfaces 120. The meniscus 150 illustrated is convex (as viewed from fluid 130), but the meniscus may be any desired shape e.g. convex, concave or substantially planar.

A pump 110 connected to the fluid filled chamber 125 is arranged to pump quantities of one or more of the fluids to and from the chamber 125. In this particular example, the pump 110 is arranged to simultaneously increase the volume of the fluid 130 and to decrease the volume of the fluid 140 (and vice versa), so as to maintain the same total volume of the two fluids within the chamber 125. The result will be that the meniscus 150 will be moved along the optical axis 90 as respective fluids are added e.g. if extra fluid 130 is added, then the meniscus may move a distance X along the optical axis, to the position indicated by the dotted line 150'. In this particular embodiment, the shape of the meniscus is not altered by this movement (as the surfaces 120 are of uniform wettability), only the location of the meniscus along the optical axis 90.

Figure 3B:
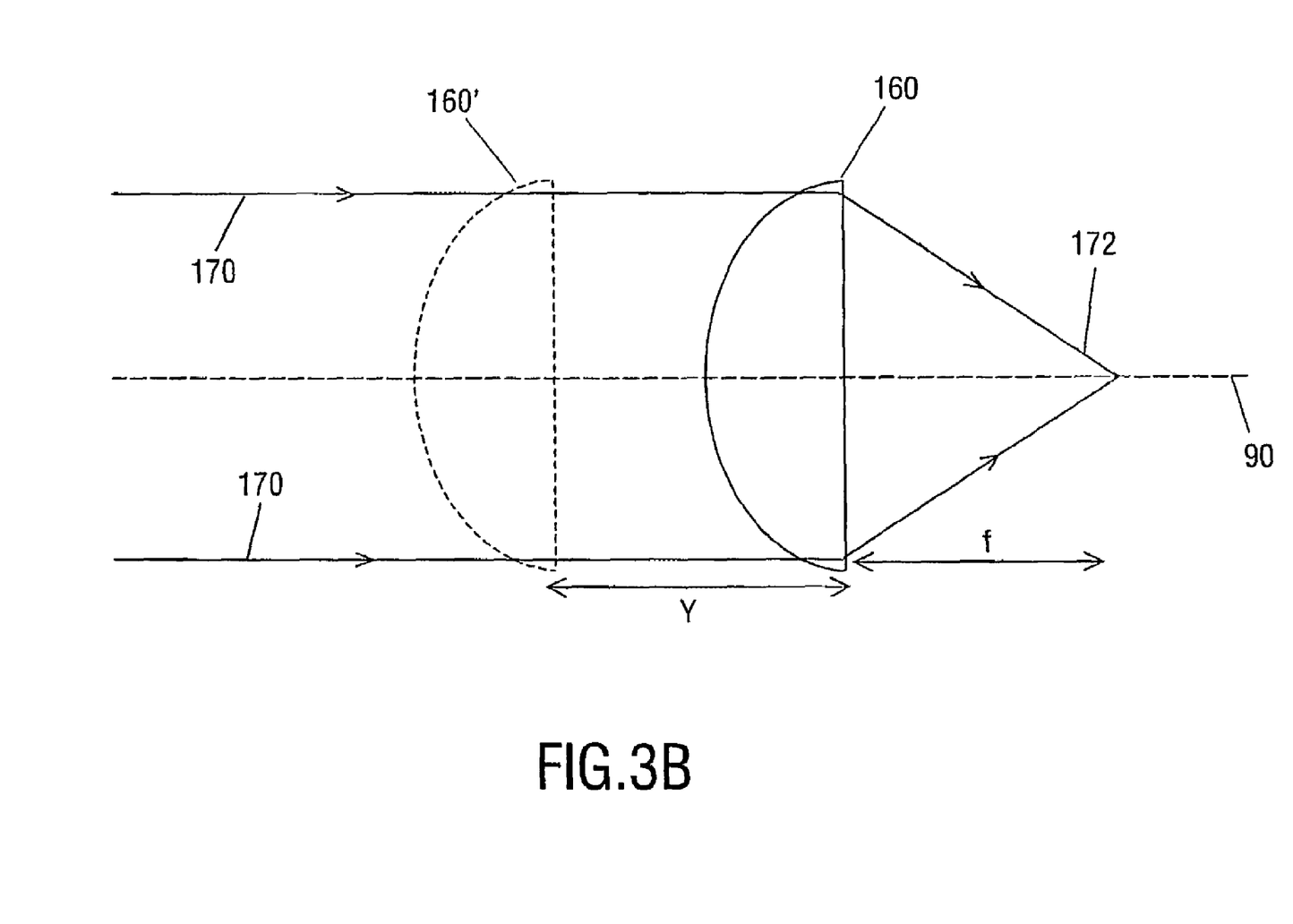

FIG. 3B illustrates the effective optical function provided by the meniscus 150 i.e. it is that of a piano convex lens 160, of focal length f. In other words, the meniscus 150 effectively provides the function of a lens 160, which would bring parallel light 170 (incident upon the lens in a direction parallel to the optical axis 90), to a focus 172 a distance f from the lens.

When the meniscus has moved (i.e. to the position shown by the dotted line 150' in FIG. 3A), then the effective position of the lens also moves, to that shown by dotted line 160'. As the menisci 150, 150' are the same shape, then equally they have the same equivalent lens shapes 160, 160' (and consequently will have the same lens properties i.e. the same power and focal distance).

FIG. 3A indicates that the meniscus is displaced a distance X to the left when it is moved from position 150 to position 150'. Similarly, the equivalent lens function 160' will also be to the left of the lens function 160. If the ray diagram of FIG. 3B is an illustration of the equivalent functions in vacuo, then 160' will be to the left of 160 by a distance Y, where Y=X/n130, with n130 being the refractive index of the fluid 130.

Figure 4:
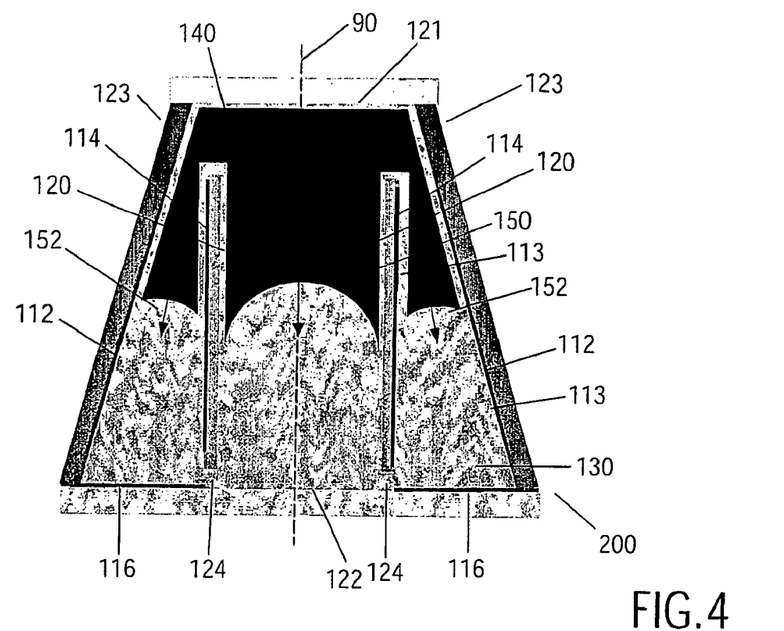
FIG. 4 illustrates a schematic cross-section of a variable lens in accordance with a second embodiment of the present invention.

FIG. 4 shows a variable lens 200 in accordance with a second embodiment of the present invention. Identical reference numerals are utilized to indicate similar features. As previously, a chamber is defined by side walls 120. The chamber contains the meniscus 150 that forms the interface between two substantially immiscible fluids 130, 140. The position of the meniscus 150 relative to the optical axis 90 is controlled by a pump.

The lens 200 essentially corresponds to a conically shaped cylinder 123 (e.g. an outer chamber) containing a concentrically placed circular cylinder 124 (e.g. an inner chamber, which has inner surfaces in the form of side walls 120). The cylinder 124 has an open connection with the rest of the liquids in the conically shaped cylinder 123. In this embodiment, the first liquid 130 is a polar or conductive liquid (e.g. water, or water with a salt added to increase its conductivity), and fluid 140 is non-conductive (e.g. silicone oil or an alkane). Annular electrode 116 is preferably in electrical contact with the first fluid 130, although it may also be capacitively coupled to the fluid via an insulating layer covering the electrode. The cylindrical electrodes 114, 112 are covered with an electrically insulating layer 113.

The majority of the internal surface of the device 200 is covered by a layer of material that is preferentially wetted by fluid 140, apart from the surfaces covering the wall 122 and the electrodes 116, which are preferentially wetted by fluid 130. For instance, if 130 is water, then the surfaces covering the wall 122 and the electrodes 116 are hydrophilic, so as to attract the water and keep the volume of water located in the correct position. The rest of the internal surface of the device is hydrophobic.

Electrowetting can be used to increase the radius of curvature of the meniscus 152 in the space between the two cylinders 123, 124. This can be achieved by applying a voltage between electrode 116 and electrodes 112, 114 (if desired, the same potential can be applied to electrodes 112, 114).

According to Laplace's law, the pressure inside the liquids is dependent on the radius of curvature of the interface between the liquids. If both liquids were confined in a cylinder, a change in pressure would not lead to a flow. However, as in this particular embodiment, both ends of the cylinder 124 are interconnected to form a closed loop, a liquid flow becomes possible. Such a liquid flow can change the position of the meniscus 150 between the two fluids. A translation of the meniscus 150 can be regarded as a translation of the position of the lens, and may therefore be used to obtain a focus action.

An increase in the radius of the meniscus 152 between the two cylinders 123, 124 will cause a decrease in the pressure difference over the meniscus. Consequently, the liquids 130, 140 will move so as to decease the radius of the meniscus 152 i.e. it will move in the direction where the space between the cylinders 123, 124 is smaller (i.e. upwards in the sense shown in FIG. 4). The interface 152 between the liquids will continue moving until the space between the cylinders 123, 124 is small enough to restore the original radius. As the total volume of the fluids 130, 140 is constant within the lens, then a movement upwards of the meniscus 152 will lead to a corresponding movement downwards of the meniscus 150 within the chamber defined by surfaces 120. As the meniscus 150 lies along the optical axis 90, then this corresponds to a change in the effective position of the lens provided by the meniscus 150. In this particular example, the surfaces 120 are substantially parallel to the optical axis, and consequently the lens function will only change in position, and not otherwise change the properties of the lens.

Figure 5:
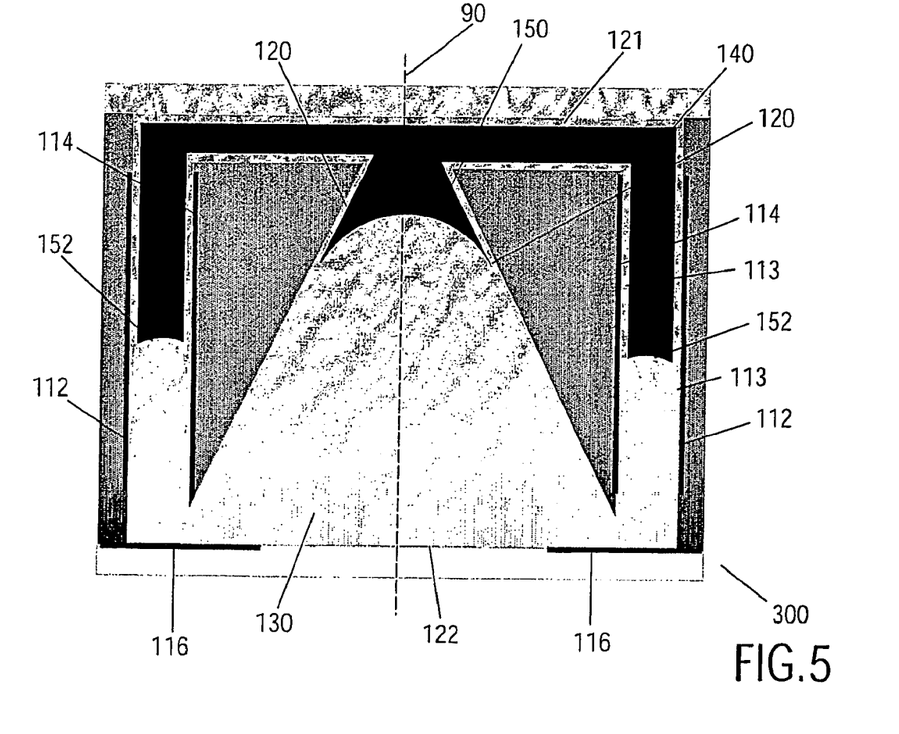
FIG. 5 illustrates a schematic cross-section of a variable lens in accordance with a third embodiment of the present invention.

FIG. 5 shows an alternative embodiment of the present invention. The structure is generally similar to that shown in FIG. 4, but in this particular embodiment the lens-forming meniscus is confined in a conical chamber defined by surfaces 120, whereas the pressure generating meniscus 152 is confined between parallel walls.

The principal of operation of this lens 300 is generally the same as that of lens 200. Consequently, the electrowetting effect is utilized to change the radius of curvature of meniscus 152, leading to a subsequent change in position of meniscus 150. However, in this particular embodiment, the radius of the meniscus 150 varies as a function of position i.e., if the meniscus moves downwards (in the sense shown in FIG. 5) then the radius of the lens increases, thus leading to a decrease in lens strength. Consequently, the design of this particular lens 300 allows both the strength and position of the lens function to be simultaneously varied. The variation in the lens strength with position can be controlled by appropriate design selection i.e. by controlling the angle of inclination of the surfaces 120 of the chamber with respect to the optical axis 90.

Preferably, in the devices shown in FIGS. 4 and 5, the conical cylinders have a relatively small angle of inclination (e.g. less than 10°, and more preferably less than 5°) relative to the optical axis 90. In other words, the conical cylinders are almost straight cylinders. This has the advantage that a small voltage variation will lead to a large displacement of the meniscus to compensate for the change in curvature. Consequently, having a small angle of an inclination provides a device that requires a relatively low voltage to function.

If desired, the surfaces of the cylinders may both be parallel with respect to each other (e.g. both circular cylinders parallel to the optical axis). In such an instance, an unstable equilibrium will arise between the two menisci (i.e. between the meniscus 150 and the meniscus 152). However, the optical meniscus 150 could be kept in position by utilizing a feed-back system, utilizing the electrowetting effect to move the meniscus 152 as required to maintain the position of meniscus 150.

Alternatively, it will be appreciated that if the inclination angle of one of the cylinders is relatively large (e.g. 45° or 60° with respect to the optical axis), then a relatively large change in voltage will be required to provide a large displacement of the meniscus. This allows very accurate placement of the position of the meniscus.

It will be appreciated that the above embodiments are provided by way of example only, and that various alternative designs will fall within the scope of the present invention.

For instance, in the above embodiments, it has been assumed that the chamber defined by side walls 120 has a circular cross section. However, it will be appreciated that the chamber can in fact be any desired cross section i.e. square, rectangular, circular or ellipsoidal. The cross-section need not be symmetrical in relation to the optical axis 90.

Figure 6A:
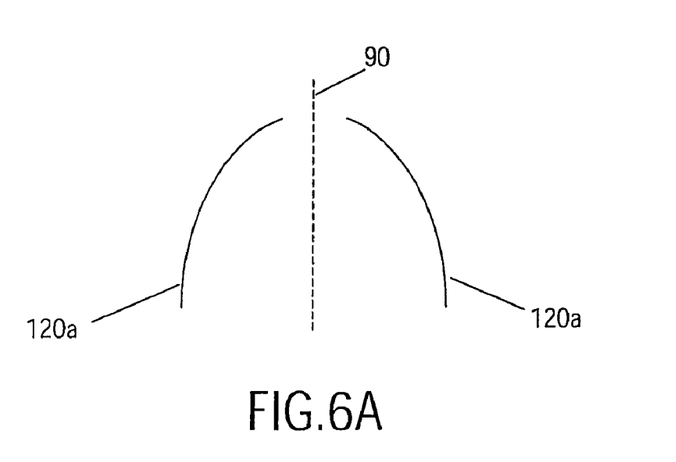
FIGS. 6A-6C illustrate examples of alternative cross-sections of the side walls for different embodiments of the present invention.

Equally, it has been assumed that the surfaces 120 forming the chamber are either inclined at a predetermined angle relative to the optical axis 90, or parallel to the optical axis 90. However, it will be appreciated that any desired orientation or change in the surfaces could be utilized. For instance, FIG. 6A illustrates a cross sectional view of the surfaces 120a forming the chamber, with the angle of inclination of the surface relative to the optical axis 90 varying with position along the optical axis i.e. the cross section of the surfaces 120a are curved.

Figure 6B:
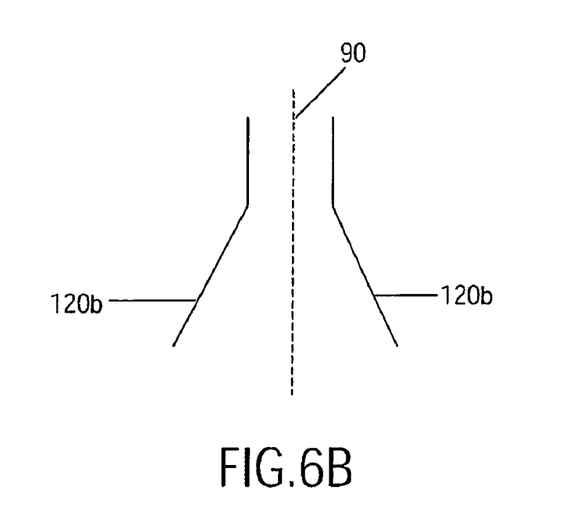

FIG. 6B illustrates an alternative configuration, in which a portion of the surfaces 120b forming the chamber are inclined relative to the optical axis, and a portion of the surfaces are substantially parallel relative to the optical axis.

Figure 6C:
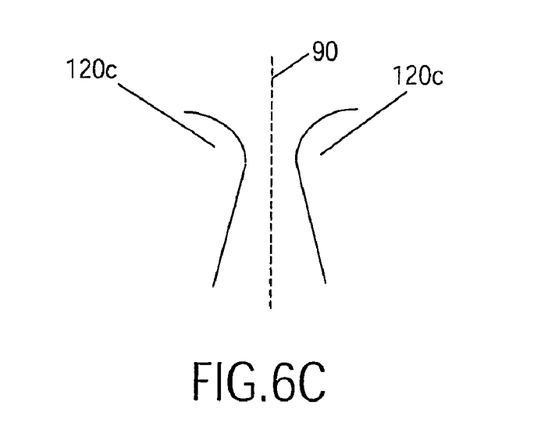

FIG. 6C illustrates a further alternative arrangement of the surfaces 120c forming the chamber, in which the surfaces are initially a predetermined distance from the optical axis, and with distance along the optical axis they incline towards the optical axis, and then are inclined away from the optical axis.

Various types of pump may be used as the pump 110. For instance, international patent application WO 02/069016 describes a number of ways of how fluid can be moved e.g. electro-capillary differential-pressure electro-capillarity, electrowetting, continuous electrowetting, electrophoresis, electroosmosis, dielectrophoresis, electrohydrodynamic pumping, thermocapillary, thermal expansion, dielectric pumping, or variable dielectric pumping, any of which could be used to provide the pump action required by the pump 110. Alternatively, a mechanical pump could also be used.

It will be appreciated that the variable lenses of the present invention can form part of any optical device requiring a lens, or indeed, the lens element described above may form part of a larger lens assembly.

For instance, at least one of the lens groups within a zoom lens could contain a lens in accordance with an embodiment of the present invention. A zoom lens is a lens (typically a camera lens) whose focal length is continuously variable, while maintaining a fixed focal plane, thus providing variable magnification of the subject. A zoom lens normally comprises two independent variable lens groups.

In the above embodiments, it has been assumed that the surfaces 120 of the chamber are of substantially uniform wettability. However, if desired the wettability of the surfaces 120 can be varied either passively (e.g. by having a coating, the wettability of which varies with distance along the optical axis), or by utilizing the electrowetting effect to change the contact angle of the meniscus 150 in contact with the surface 120. Such an effect can be used to change the lens strength to the desired strength, by altering the radius of curvature of the lens. Such a lens can be used as a zoom lens, as position as well as optical power of the lens can be adjusted separately.

Figure 7:
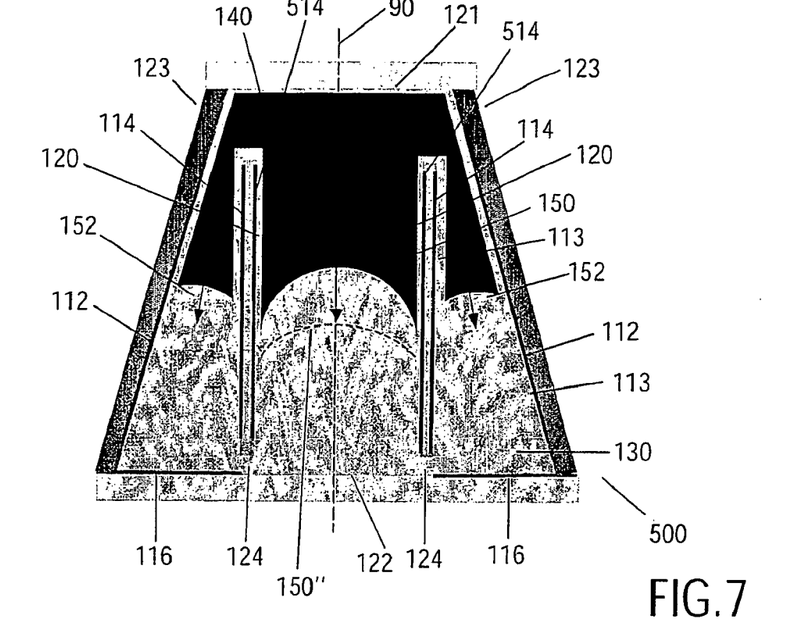
FIG. 7 illustrates a schematic cross section of a variable lens in accordance with a fourth embodiment of the present invention.

FIG. 7 illustrates a lens 500 in accordance with another embodiment of the present invention. The lens structure is generally similar to that of the lens 200 shown in FIG. 4. However, an extra electrode (in this instance a cylindrical electrode 514) has been provided to utilize the electrowetting effect to change the contact angle of the meniscus 150 in contact with the surface 120. The electrode 514 is covered by an insulator (e.g. the surface 120). This allows the radius of the meniscus 150 to be varied separately from that of the meniscus 152. Consequently, both the radius and the position of the lens function provided by the meniscus 150 can be controllably altered by providing a voltage between electrodes 112/114 and 116, and a voltage between the electrodes 116 and 514. For instance the position and shape of the meniscus 150 could be changed to the position and shape shown by dotted line 150". Thus it becomes possible to vary the focal distance of the lens by changing the curvature of the meniscus 150, whilst still keeping the object in focus by moving the position of the meniscus 150. This allows a zoom lens to be constructed in which light has to pass through only one variable interface.

Figure 8:
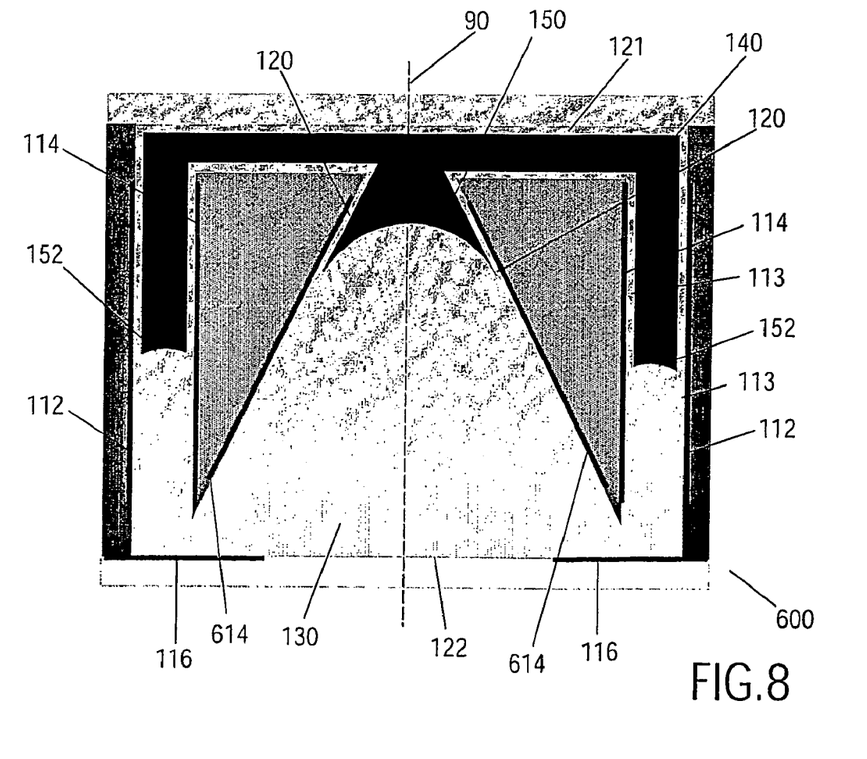
FIG. 8 illustrates a schematic cross section of a variable lens in accordance with a fifth embodiment of the present invention.

FIG. 8 shows a lens 600 in accordance with another embodiment of the present invention. The lens shape is generally similar to the lens 300 shown in FIG. 5, with the addition of an extra electrode 614 beneath the surface 120. The conical electrode 614 is arranged to alter the contact angle of the meniscus 150 with the surface 120. In this particular embodiment, the radius of the meniscus 150 (and hence the radius of the lens function provided by the meniscus) is not only dependent on the voltage of electrode 614, but also on the position of the meniscus 150. If the meniscus 150 is moved downwards, the radius (and with that the lens strength) will decrease. For a certain angle of inclination of the surface 120 it becomes possible to keep an object in focus whilst zooming in or out by changing only one voltage.

Lenses in accordance with embodiment of the present invention can be used in a variety of applications and devices.

Figure 9:
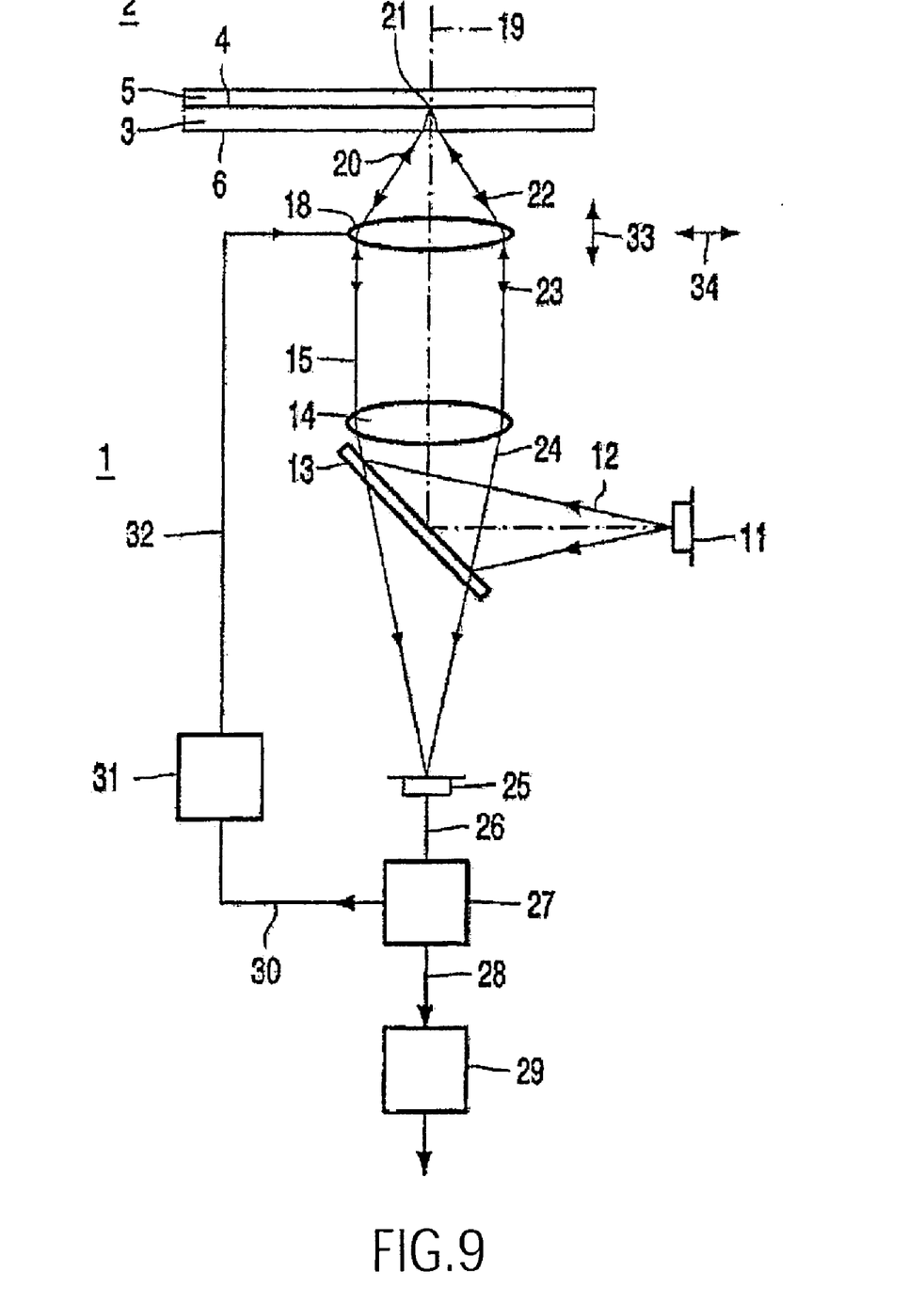
FIG. 9 illustrates a device for scanning an optical record carrier including a variable lens in accordance with an embodiment of the present invention.

FIG. 9 shows a device 1 for scanning an optical record carrier 2, including an objective lens system 18 comprising a variable focus lens in accordance with an embodiment of the present invention. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4.

Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot. The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 9 in this particular embodiment is adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

For instance, in dual layer DVR (Digital Video Recording) discs, the two information layers are at depths of 0.1 mm and 0.08 mm; they are thus separated by typically 0.02 mm. When refocusing from one layer to another, due to the difference in information layer depth, some 200 m$\lambda$ of unwanted spherical aberration arises, which needs to be compensated. This can be achieved by introducing spherical aberration into the objective system 18, such that the spherical aberrations cancel out.

In one embodiment of this invention, spherical aberration is introduced into the objective system 18 by altering the collimation of the beam 15 incident upon the objective system 18, by using a variable lens in accordance with the present invention. Such a variable lens can be incorporated as an extra device within the optical path of the beam 15 or the variable lens can form part of the lens 14 (e.g. lens 14 is a compound lens). By varying the position of the meniscus within the variable lens, the beam 15 can be varied from being parallel, to be slightly converging or diverging as required, so as to introduce the desired spherical aberration.

Figure 10:
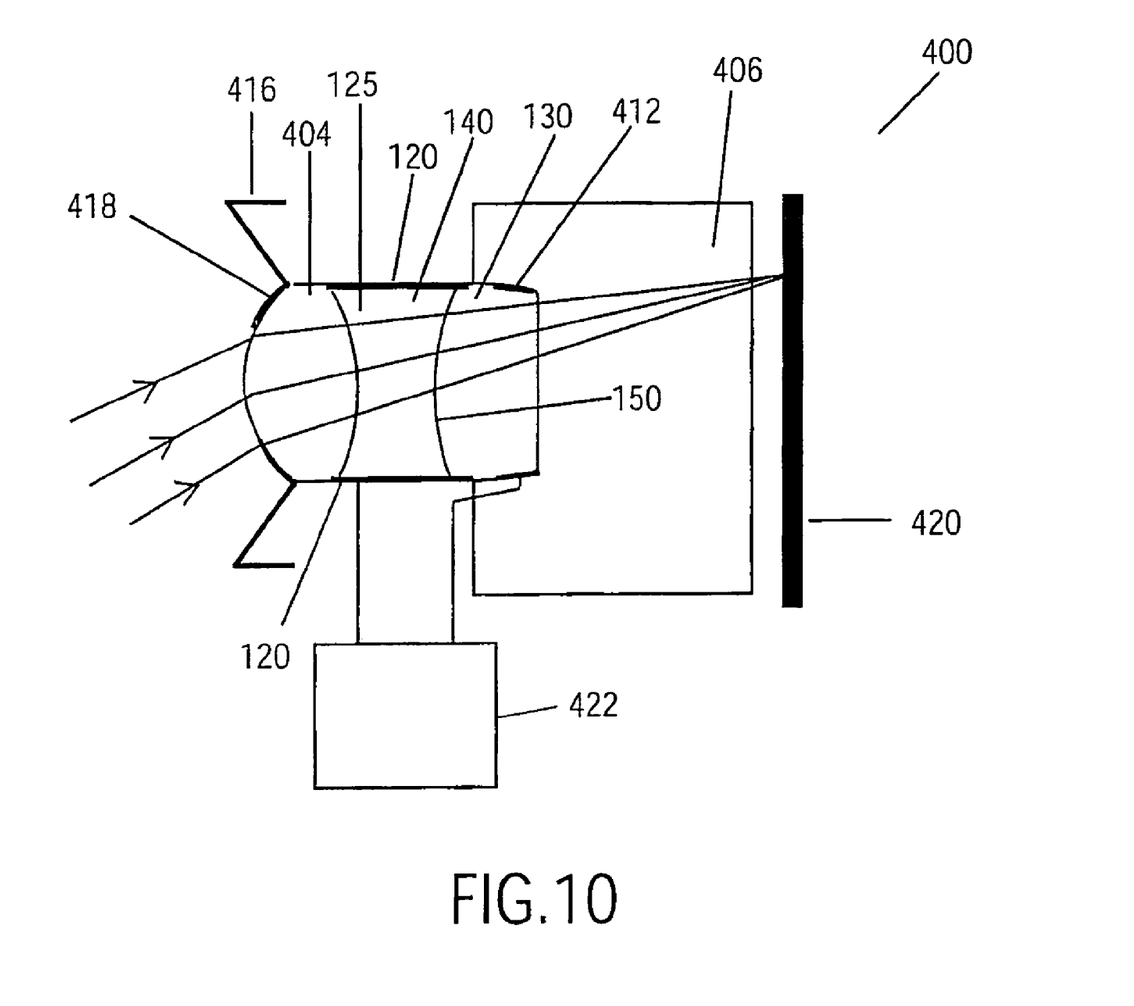
FIG. 10 illustrates a variable focus image capture device including a variable lens in accordance with an embodiment of the present invention.

FIG. 10 illustrates a variable focus image capture device 400 including a lens in accordance with an alternative embodiment of the present invention.

The device 400 includes a compound variable focus lens including a cylindrical tube of surfaces 120, a ridged front lens 404, and ridged rear lens 406. The spacing enclosed by the two lenses and the tube forms a cylindrical fluid chamber 125. The fluid chamber 125 holds the first and second fluids 130 and 140. The two fluids touch along a meniscus 150. The meniscus forms a meniscus lens of variable position, as previously described, depending upon the respective volume of each fluid provided to the chamber by the pump 422.

The front lens 404 is a convex-convex lens of highly refracting plastic, such as polycarbonate or cyclic olefin copolymer (COC), and having a positive power. At least one of the surfaces of the front lens is aspherical, to provide the desired initial focusing characteristics. The rear lens element 406 is formed of a low dispersive plastic, such as COC, and includes an aspherical lens surface which acts as a field flattener. The other surface of the rear lens element may be flat, spherical or aspherical.

A glare stop 416 and an aperture stop 418 are added to the front of the lens. A pixellated image sensor 420, such as a CMOS (Complimentary Metaloixde Semi-Conductor) sensor array, is located in a sensor plane behind the lens.

The pump 422 drives the lens, in accordance with a focus control signal, derived by focus control processing of the image signals, so as to provide an object range of between infinity and 10 cm.

The front lens element 404 is preferably formed as a single body with the chamber, the chamber being closed off by the rear lens 406 to form a sealed unit. The second lens element 406 may be extended, in relation to that shown in FIG. 8, and the flat rear surface of the lens element 406 may be replaced by an angled mirror surface, preferably angled at 45°, to allow the image sensor 420 to be placed below the lens, in order to reduce the dimensions of the lens.

The inner surfaces of the front lens 404 and the rear lens 406 may be coated with a protective layer to avoid incompatibility of the material from which the lens are made with the fluids 130 and 140. The protective layer may also have anti-reflection characteristics.

By the above examples, it will be appreciated that in embodiments of the present invention, a variable lens is provided in which the effective position of the lens can easily be adjusted by moving the meniscus. By appropriate design of the surfaces of the chamber of the lens, the shape (and hence focal length) of the lens may also be adjusted at the same time as the lens is moved. As no mechanical components are required within the optical path, then the optical path does not suffer from mechanical wear and tear.

The invention claimed is:
1. A variable lens comprising:
a chamber defined by at least one side wall and having an optical axis extending longitudinally through the chamber;
the chamber containing a first fluid and a second fluid in contact over a meniscus extending transverse the optical axis, the perimeter of the meniscus being constrained by said at least one side wall, the first and second fluids being substantially immiscible and having different indices of refraction; and at least one pump arranged to controllably alter a position of the meniscus along the optical axis without changing a shape of the meniscus by altering a relative volume of each of said first and second fluids contained within the chamber.

2. The lens as claimed in claim 1, wherein the at least one pump operates at least one of:

electro-capillary, differential-pressure electro-capillarity, electrowetting, continuous electrowetting, electrophoresis, electroosmosis, dielectrophoresis, electrohydrodynamic pumping, thermocapillary, thermal expansion, dielectric pumping, mechanic pumping or variable dielectric pumping.

3. The lens as claimed in claim 1, wherein wettability of an internal surface of the chamber varies longitudinally.

4. The lens as claimed in claim 1, wherein the chamber has a circular cross-section.

5. The lens as claimed in claim 1, wherein the lens is a zoom lens.

6. A variable lens comprising:

a chamber defined by at least one side wall and having an optical axis extending longitudinally through the chamber;

the chamber containing a first fluid and a second fluid in contact over a meniscus extending transverse the optical axis, the perimeter of the meniscus being constrained by said at least one side wall, the first and second fluids being substantially immiscible and having different indices of refraction; and at least one pump arranged to controllably alter a position of the meniscus along the optical axis by altering a relative volume of each of said first and second fluids contained within the chamber, wherein at least one of the side walls defining an interior surface of the chamber which is not parallel to the optical axis.

7. A variable lens comprising:

a chamber defined by at least one side wall and having an optical axis extending longitudinally through the chamber;

the chamber containing a first fluid and a second fluid in contact over a meniscus extending transverse the optical axis, the perimeter of the meniscus being constrained by said at least one side wall, the first and second fluids being substantially immiscible and having different indices of refraction; and at least one pump arranged to controllably alter a position of the meniscus along the optical axis by altering a relative volume of each of said first and second fluids contained within the chamber, wherein wettability of internal surface of the chamber is arranged to be controllably altered by an electrowetting effect.

8. An optical device comprising a variable lens, the variable lens comprising:

a chamber defined by at least one side wall and having an optical axis extending longitudinally through the chamber;

the chamber containing a first fluid and a second fluid in contact over a meniscus extending transverse the optical axis, a perimeter of the meniscus being constrained by said at least one side wall, the first and second fluids being substantially immiscible and having different indices of refraction; and at least one pump arranged to controllably alter a position of the meniscus without changing a shape of the meniscus along the optical axis by altering a relative volume of each of said first and second fluids contained within the chamber.

9. The optical device as claimed in claim 8, wherein the optical device is an optical scanning device for scanning an information layer of an optical record carrier, the optical device comprising a radiation source for generating a radiation beam and an objective system for converging the radiation beam on the information layer.

10. The optical device as claimed in claim 8, wherein the optical device is a variable focus image capture device.

11. A method of manufacturing a variable lens, the method comprising the acts of:

providing a chamber defined by at least one side wall and having an optical axis extending longitudinally through the chamber;

providing a first fluid and a second fluid in the chamber such that the first and second fluids are in contact over a meniscus extending transverse the optical axis, a perimeter of the meniscus being constrained by said at least one side walls, the first and second fluids being substantially immiscible and having different indices of refraction; and providing at least one pump arranged to controllably alter a position of the meniscus without changing a shape of the meniscus along the optical axis by altering a relative volume of each of said first and second fluids contained within the chamber.

12. A method of manufacturing an optical device, the method comprising the acts of:

providing a variable lens, the variable lens comprising:

a chamber defined by at least one side wall and having an optical axis extending longitudinally through the chamber;

the chamber containing a first fluid and a second fluid in contact over a meniscus extending transverse the optical axis, a perimeter of the meniscus being constrained by said at least one side walls, the first and second fluids being substantially immiscible and having different indices of refraction; and at least one pump arranged to controllably alter a position of the meniscus without changing a shape of the meniscus along the optical axis by altering a relative volume of each of said first and second fluids contained within the chamber.

* * * * *